(12) United States Patent
Bauer et al.

(10) Patent No.: US 9,939,814 B1
(45) Date of Patent: Apr. 10, 2018

(54) COMPUTER SYSTEM AND METHOD FOR AUTOMATED MAPPING BY ROBOTS

(71) Applicant: Savioke, Inc., San Jose, CA (US)

(72) Inventors: Robert S. Bauer, Portola Valley, CA (US); Alain Minier, Fontenay-aux-Roses (FR); Stephan Wirth, Palma de Mallorca (ES); Lucas Chiesa, Buenos Aires (AR); Christian Fritz, Menlo Park, CA (US); Adrian Canoso, Sunnyvale, CA (US)

(73) Assignee: Savioke, Inc., San Jose, CA (US)

( * ) Notice: Subject to any disclaimer, the term of this patent is extended or adjusted under 35 U.S.C. 154(b) by 0 days.

(21) Appl. No.: 15/584,012

(22) Filed: May 1, 2017

(51) Int. Cl.
*G05B 19/04* (2006.01)
*G05D 1/02* (2006.01)
(Continued)

(52) U.S. Cl.
CPC ........... *G05D 1/0088* (2013.01); *G01C 21/32* (2013.01); *G05D 1/0246* (2013.01); *G05D 1/0285* (2013.01)

(58) Field of Classification Search
CPC .... G05D 1/008; G05D 1/0246; G05D 1/0285; G05D 1/0221; G01C 21/32; G01C 21/206
See application file for complete search history.

(56) References Cited

U.S. PATENT DOCUMENTS 7,584,020 B2 * 9/2009 Bruemmer ............. G06N 3/008
318/567
8,060,254 B2 * 11/2011 Myeong ............... G05D 1/0246
700/245
(Continued)

OTHER PUBLICATIONS

GeertJan M., "Clarification dialogues in humanaugmented mapping", Human Robot Interaction '06 Salt Lake City, Utah USA, dated 2006, 8 pages.
(Continued)

*Primary Examiner* — Michael J Zanelli
(74) *Attorney, Agent, or Firm* — Hickman Palermo Becker Bingham LLP

(57) ABSTRACT

A method for autonomous map generation by a robot comprising: instructing the robot to traverse a route within an environment in which the robot is deployed; while following the route, causing the robot to collect sensor data to identify features in the environment and to generate an initial map of areas in environment that have been traversed; upon completion of the route, autonomously generating a map of valid areas of the environment by moving throughout the environment while collecting sensor data; while autonomously generating the map, determining that a particular area is potentially invalid by detecting features that are previously unknown to the robot; generating and providing an electronic message to an operator of the robot comprising sensor data of the particular area and a prompt requesting information indicating whether the particular area is valid or invalid; upon receiving a response from the operator, continuing autonomously generating the map according to the response wherein if the particular area is valid, collecting sensor data from the particular area and, if the particular area is invalid, proceeding to an unmapped, valid area of the environment; determining that there are no remaining unmapped, valid areas of the environment, ending autonomously generating the map.

24 Claims, 9 Drawing Sheets

(51) Int. Cl.
  *G01C 21/32*   (2006.01)
  *G05D 1/00*    (2006.01)

(56) References Cited

U.S. PATENT DOCUMENTS

| | | |
|---|---|---|
| 8,538,686 B2 | 9/2013 | Gruen |
| 9,382,003 B2 | 7/2016 | Burema |
| 2004/0167667 A1* | 8/2004 | Goncalves .............. G01C 21/12 |
| | | 700/245 |
| 2005/0197175 A1 | 9/2005 | Anderson |
| 2010/0217438 A1 | 8/2010 | Kawaguchi |
| 2010/0223031 A1* | 9/2010 | Vincent ............... G06F 17/5004 |
| | | 703/1 |
| 2014/0005933 A1* | 1/2014 | Fong .................... G05D 1/0274 |
| | | 701/447 |
| 2015/0242806 A1 | 8/2015 | Cousins |
| 2016/0271795 A1* | 9/2016 | Vicenti .................... B25J 9/163 |

OTHER PUBLICATIONS

Fetch Robotics, "Is cloud-based fleet management software that allows you to quickly set up and deploy your robots", http://fetchrobotics.com/fetchcore/, last viewed on Sep. 13, 2017, 3 pages.
Axel Rottmann, "Semantic Place Classification of Indoor Environments with Mobile Robots using Boosting", 2005, American Association for Artificial Intelligence (www.aaai.org), 6 pages.
Canoso, U.S. Appl. No. 15/706,602, filed Sep. 15, 2017, Office Action, dated Oct. 24, 2017.

\* cited by examiner

COMPUTER SYSTEM AND METHOD FOR AUTOMATED MAPPING BY ROBOTS

FIELD OF THE DISCLOSURE

The present disclosure relates to mobile digital computer controlled robots that autonomously navigate a bounded area. The disclosure relates more specifically to computer-implemented techniques for generation of a robot-readable map of the bounded area.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Robots are no longer only used in manufacturing. Increasingly, robots have found use in hospitality, medicine, and transportation of goods. Some robots, such as those designed and manufactured by Savioke, Inc. of San Jose, Calif., are wheeled machines that transport goods within a campus or other defined environment, such as a hotel or hospital. These robots are deployed by computer or human operators to complete a task, such as delivering hot towels to a guest room. Once deployed, a particular robot may navigate a building or set of buildings from its current location to its destination.

In order to navigate to its destination, the robot uses data defining a layout of the campus or environment. The data may be stored in the form of a digital map of a campus, building, or floor within a building. However, statically defining an environment has the significant drawback of requiring an update to data storage or memory of the robot when the environment changes as a result of construction, demolition, or changes in security or other operational policy. There is a need in the robotics field to digitally define an environment for robot operation through other than static means.

SUMMARY OF THE INVENTION

The appended claims may serve as a summary of the invention.

DETAILED DESCRIPTION

Figure 1:
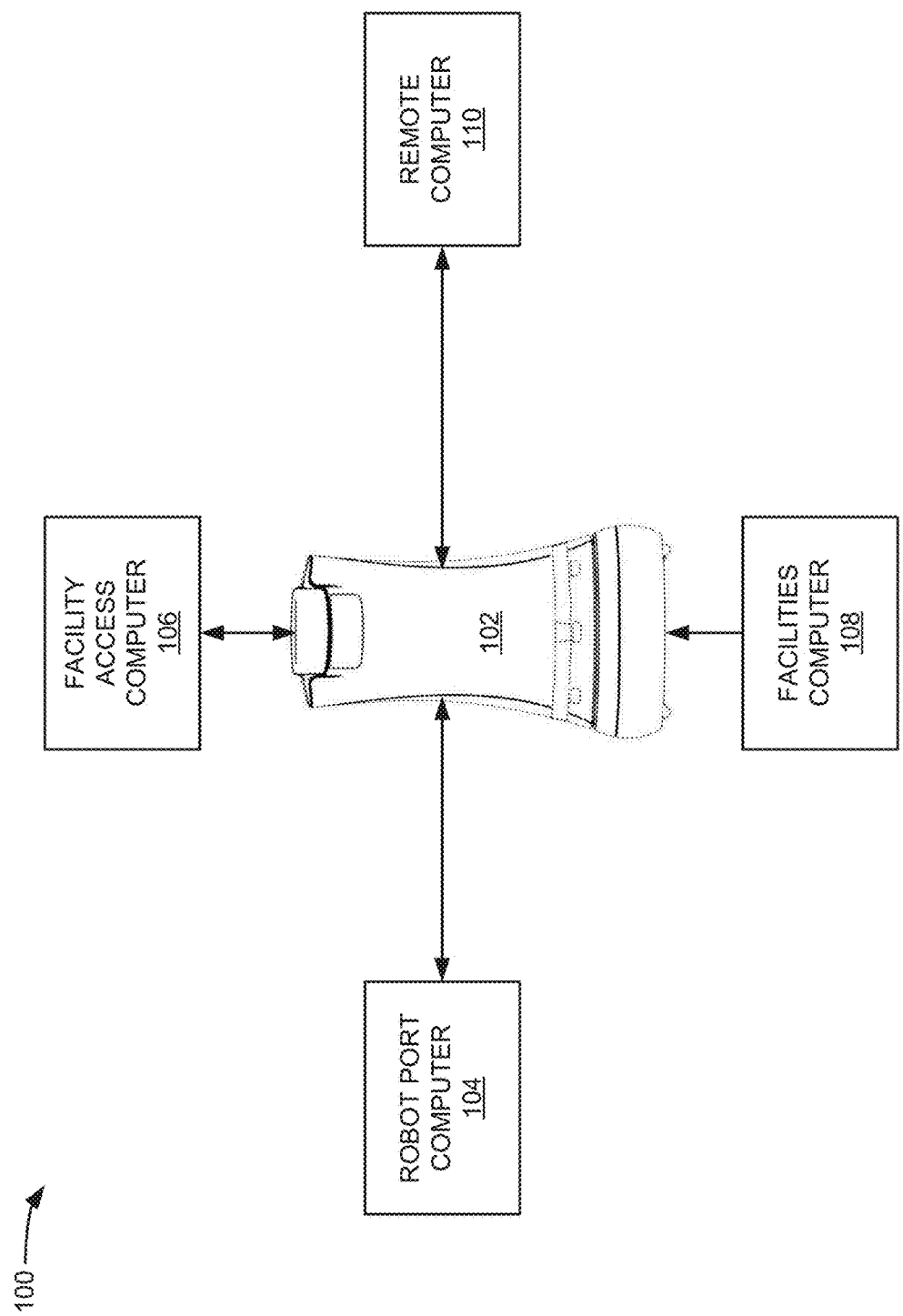
FIG. 1 is a diagram of a networked environment in which a robot may operate, according to various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, digital computer controlled electro-mechanical robots may be deployed within a building. The robots may be programmed to navigate areas of the building. For example, a robot may be programmed to transport items between people or locations. As another example, a security robot may be programmed to patrol areas of a building.

To navigate to its destination, the robot uses a digitally stored map of the building to determine a route and to navigate hallways, elevators, and other features of the environment. Due to minor variations between the actual building and a building plan, and to account for differences in calibration or precision of mechanical systems such as servos, a robot typically generates a digital robot-readable map of the actual, physical building by exhaustively navigating through the building before the robot is deployed on a specific task.

To generate a digital robot-readable map, the robot traverses a demonstration route that an operator selects. Upon completion of the demo route, the robot begins autonomously mapping the building by navigating its local area, identifying potential hazards including staircases and closed doors, and using elevators to navigate between floors. The robot, upon encountering an unknown feature, is programmed to determine whether to contact the operator, and may remotely communicate with the operator via email or other electronic means. The robot autonomously determines when mapping is complete before returning to a home, a port or other location from which it may be deployed.

The generation of the robot-readable map by the robot itself improves the functioning of the robot itself. Maps generated using other techniques may have minor errors due to, for example, construction variances, incorrect annotations of areas that are off-limits, and errors introduced from operations used to convert a human-readable map to a robot-readable map. The robot-readable map can be efficiently accessed and read by the robot while including the data required by the robot to navigate the building.

For purposes of illustrating clear examples, certain sections of this disclosure refer to specific environments such as a hotel or building, or to specific environmental features such as floors or elevators. However, these examples are provided only for clarity and are not intended to limit the scope of the disclosure. For example, the term "environment" may include buildings of any kind including hotels, offices, hospitals, homes, museums, restaurants or any other space that is capable of traversal by a mobile ground traveling autonomous vehicle such as a robot. Features of environments may include floors, levels, stairways, ramps, slides, elevators, doors, windows, sidelights, transoms, tunnels, breezeways, skywalks, portals, columns, partitions, walls, objects, obstacles and so forth.

In one embodiment, the disclosure provides a method for a robot to autonomously generate a digitally stored map of an environment, the method comprising receiving, via an input signal to a stored program executing in the robot, an instruction to physically traverse a route within the environment, the route comprising a path through the environment, and in response to the input signal, initiating physical traversal of the robot of the route; while traversing the route, collecting digital data from one or more sensors of the robot and digitally transforming the collected digital data to result in identifying one or more features of the environment and to generate a digitally stored initial map representing the environment that have been traversed; in response to detecting completion of traversal of the route, initiating traversal of the environment using other than the demonstration route, and: concurrently generating and digitally storing a second digital map of valid areas of the environment, while generating the second digital map, determining that a particular area is potentially invalid based on detecting features of the environment that are not represented in stored environment data, and in response, generating and transmitting an electronic message comprising sensor data for the particular area and a prompt requesting information indicating whether the particular area is valid; in response to input indicating that the particular area is valid, traversing the particular area and continuing generating the second digital map, and in response to input indicating that the particular area is invalid, avoiding traversing the particular area and moving to an unmapped valid area of the environment; repeating the preceding steps relating to generating the second digital map until all valid areas of the environment have been traversed.

2. Networked Environment

FIG. 1 is a diagram of an example networked environment in which a robot may operate, according to various embodiments.

The networked environment 100 of FIG. 1 provides certain computing infrastructure to support a robot 102, to allow the robot to access building features such as locked doors or elevators, and to allow an operator to communicate directly with the robot. The networked environment 100 includes the robot and one or more computers that are local to the building or campus in which the robot is deployed. In some embodiments, remote computers may be included in the networked environment 100. The local computers within the networked environment 100 may be physically present in the building.

In this example, the robot 102 is an autonomous, wheeled, battery-powered electro-mechanical robot under control of a programmed digital computer contained in the robot. The robot 102 moves using a set of wheels mounted on the bottom surface of the robot. The robot 102 may move at velocities appropriate to its environment, typically at a human walking speed or slower. The wheels of the robot 102 may be selected for performance on a variety of indoor and outdoor surfaces including tile, carpet, and concrete.

In some embodiments, robot 102 includes at least one storage compartment that can be electronically opened by the robot for access by an operator or human at an origin or destination. The storage compartment may be sized to hold items that are appropriate to the environment. For example, in hospitality applications, the storage compartment may permit carrying any of: linens; toiletries; medications; magazines and reading materials; lost and found items such as wallets, keys, and personal electronic devices.

The storage compartment may have an electronic lock that is controlled by the robot 102. In some embodiments, robot 102 is programmed to open the storage compartment upon arriving at its destination or in response to an instruction or sensor when the destination is reached. The instruction may include, for example, a passcode; a confirmation of the person's identity at the destination; an electronic communication with a personal electronic device of the person receiving the delivery via, for example, RFID or Bluetooth. The storage compartment may include a scale, pressure switch or other mechanism to detect the placement or removal of items in or from the storage compartment, such that placing an item in the compartment depresses the scale or triggers the switch and removing the item from the compartment releases the scale or switch. A digital interface may gate or latch a signal from the scale or switch to instruct the computer in the robot that an item was placed on or removed from the compartment.

In an embodiment, robot 102 includes a touchscreen that displays a graphical user interface (GUI) to communicate messages and that is generated under program control. The GUI may receive input via the touchscreen and the input may represent instructions for operation of the robot 102. The instructions may include an instruction to open the storage compartment, a response to a request for information presented by the robot during an autonomous mapping operation; a confirmation that the item, or the correct item, is in the storage compartment and is delivered. In some embodiments, other input mechanisms such as keyboards may be incorporated in robot 102.

In an embodiment, robot 102 includes numerous sensors for receiving data about the building and its location within the building. These sensors include, for example, laser sensors, Light Detection and Ranging (LIDAR) position or motion sensors, 3D cameras, color cameras, accelerometers, barometers, altimeters or others. In an embodiment, the laser sensors, LIDAR, 3D cameras, and color cameras collect data that can be transformed under program control to form a model of an environment and its obstructions or objects; dimensions of features such as rooms, hallways, doors, and windows; identification of features including staircases, elevators, doorways, signs, and fiducials; and other environment data. In an embodiment, the barometer detects an altitude of the robot 102 based on digitally transforming a reading of ambient atmospheric pressure and provides data that may be used, for example, to identify a floor on which the robot 102 is currently located if the environment is multi-story. In an embodiment, the accelerometer provides data about the speed and/or direction of the movement of the robot 102, alone or in combination with a digital compass.

In an embodiment, robot 102 comprises one or more network interfaces that communicate with the computers within the networked environment 100. The network interfaces may include interfaces that communicate via Wireless Fidelity (WIFI), 3G and/or 4G modems, Bluetooth, infrared, and low-bandwidth radio. In some embodiments, the robot 102 uses a Global Positioning System (GPS) to determine its location. In some embodiments, the robot 102 uses the WIFI interface to wirelessly transmit signals to other wired or wireless networked devices to open doors, or call and direct an elevator.

In an embodiment, robot 102 executes mapping software stored in memory. The mapping software, when executed, causes the robot to generate a robot-readable map of its location and/or a route to a destination. In an embodiment, the mapping software instructs the robot 102 to traverse or explore its environment using the onboard sensors. In an embodiment, based on the traversal, the mapping software generates a map of a floor or other environment. Additionally or alternatively, the map may comprise data describing a plurality of areas of the environment. The data may include navigation information such as objects or obstacles, valid or invalid areas of the environment, WiFi intensity information, and etc. The data may be stored in one or more map layers. In an embodiment, data representing locations in the environment, objects or obstacles may be stored in association with cost values or weight values.

In an embodiment, the environment includes a robot port having a robot port computer 104. The robot port is a device in which, or next to which, the robot 102 returns when not in use. In an embodiment, the robot port may include power connections to which the robot 102 can automatically connect and that charge a battery of the robot. For example, the robot and port may be structured to enable the robot to automatically contact the power connections when the port is reached or mechanically engaged.

In an embodiment, the port further comprises a data interface and data connector to which the robot 102 may automatically connect or engage when the robot is in the port. Or, the robot 102 may have internal wireless networking circuitry that is interfaced to its CPU and appropriate software to permit the robot to establish a wireless network connection to a nearby access point and thereby reach a host computer to upload or download data. In an embodiment, using the data interface of the port or the wireless interface, the robot port computer 104 may download from the robot 102 data comprising a list of deliveries, a history of the robot's, and communications between the robot and other computers or received via the GUI. In some instances, the robot port computer 104 or host computer may upload data to the robot 102 including, for example, software updates, map or facility updates, and data used to identify building-specific features such as doors. In some embodiments, port computer 104 or another host computer is programmed to obtain, via a network, environment data for environments other than the one in which robot 102 is located, including traversal data obtained from other robots that have operated in other environments. The other environments may be closely similar to the local environment or different. For example, if the local environment is a building structure that has been constructed according to a plan that has been replicated to construct other similar buildings in other locations, then traversal data obtained from other robots that are geographically distant may be relevant in resolving traversal of obstructions or features of the local environment. Furthermore, robot port computer 104 may act as an intermediary to communicate data between robots 102 deployed within the building or on campus.

In an embodiment, a facilities access computer 106 provides access to building features that accommodate the robot 102. The facilities access computer 106 may provide an application programming interface (API) that the robot 102 is programmed to call with instructions and data configured to direct the facilities access computer to operate elevators and other transportation mechanisms, request operation of electronic doors, or control security sensors. In an embodiment, the facilities access computer 106 communicates with the electronic systems within the building such as elevators, door locks, door opening systems, security sensors, and the like.

In an embodiment, facilities computer 108 is programmed with supervisory functions for one or more robots 102, and provides an interface for an operator to communicate with the robot. The facilities computer 108 may respond to requests made by the robot 102 during autonomous mapping. The facilities computer 108 may deploy the robot 102 on pick-ups, deliveries, or other tasks. In some embodiments, the facilities computer 108 may provide data regarding the location of temporary obstacles in the environment. Examples include holiday decorations, large crowds, and temporary installations. The data may be stored in a persistent data repository and associated with an anticipated expiration date or time-to-live value. The data may be communicated directly to the robot 102 via WIFI or via the robot port computer 104.

In an embodiment, a remote computer 110 in FIG. 1 comprises a computer that is not local to the robot 102 and is not located within the building or campus in which the robot 102 is deployed. The remote computer 110 may communicate data with the robot 102 from outside sources; examples include weather data, news and public interest stories, or other sources that provide data used by the robot 102. In some instances, the remote computer 110 may be, or communicate with, a personal electronic device of a human user who has arranged a delivery. In such instances, the remote computer 110 may be a Short Message Service (SMS) server or Multimedia Message Service (MMS) server.

3. Example Mapping Process

Figure 2:
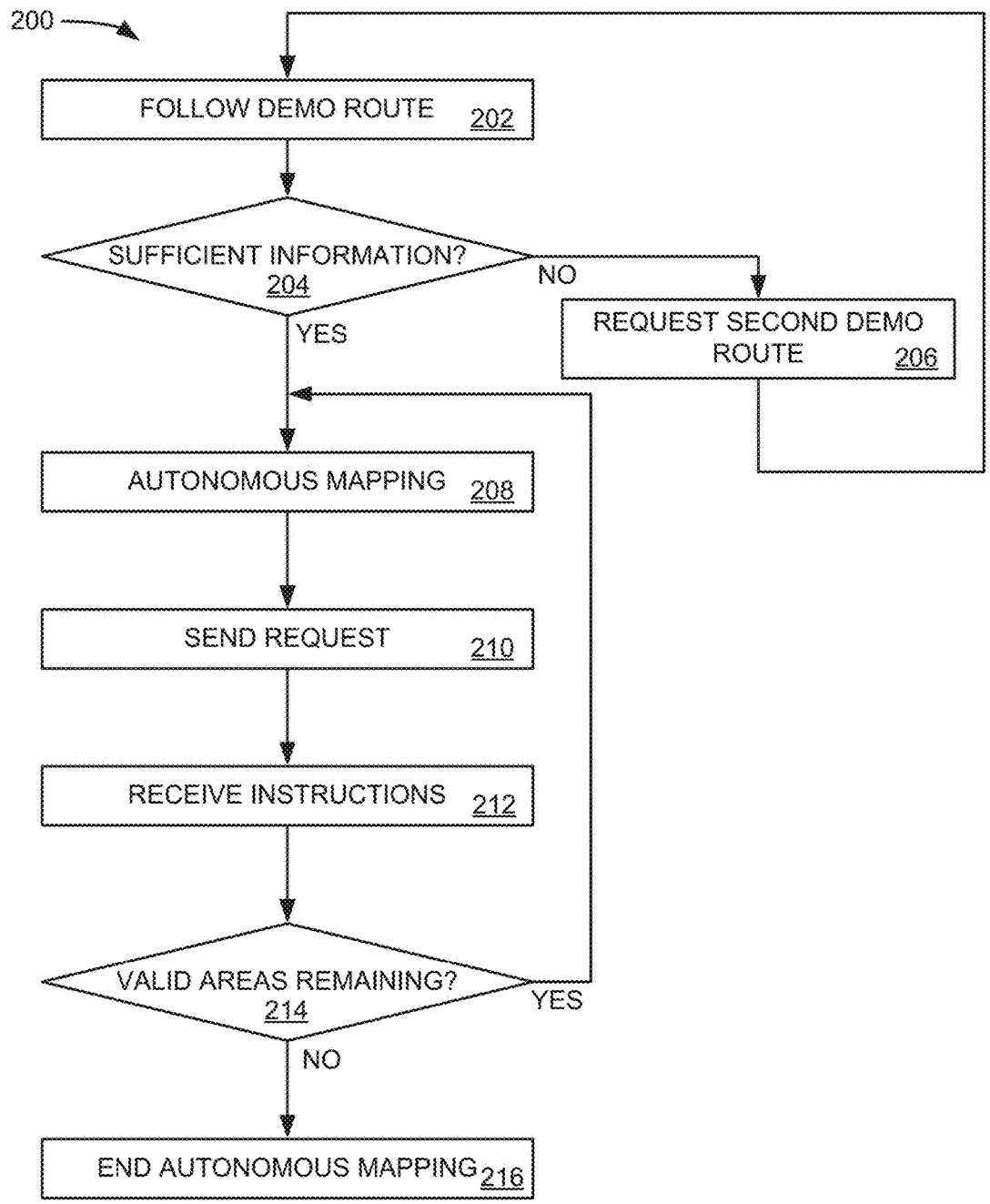
FIG. 2 is a flowchart of an example process for autonomously mapping a floor of a building, according to some embodiments.

FIG. 2 is a flowchart of an example process that may be programmed in a robot for autonomously mapping a floor of a building, according to some embodiments.

In an embodiment, robot 102 executes a stored program implementing process 200 shortly after arriving in an environment. For example, process 200 may be invoked, initiated or executed when the robot 102 is placed in a building for the first time. During execution of process 200, robot 102 creates and stores descriptions and labels of features such as doors, elevator doors, signage, fiducials, stairways, and the like in memory or other storage at the robot.

In an operation 202, the robot 102 follows a demonstration (demo) route. The demo route typically is a predefined path that is known to expose the robot to example features of the environment. In some embodiments, the demo route may be an origin point and a destination point, rather than a fully defined path. The demo route may be representative of a path that the robot 102 may use in the future in operation, for example to deliver or pickup an item. In the case of a hotel, the demo route may start at an arbitrary location and include the robot port, the front desk, an elevator, and a guest room. The robot 102 may initiate operation on the demo path in response to an instruction via the GUI using the touchscreen, for example. To follow the demo path, robot 102 may operate, either fully autonomously or under partial operator control, to follow a human operator who is walking or following a path corresponding to the demo route. Robot 102 is programmed, as part of operation 202, to collect sensor data about the environment. In an embodiment, when the operator has completed the demo route, the operator instructs the robot 102 that the demo route is complete; for example, an instruction may be provided in the GUI using the touchscreen of the robot.

Additionally or alternatively, the robot 102 traverses a demonstration (demo) area. The demo area may be a pre-defined area that is known to expose the robot to example features of the environment.

Additionally or alternatively, in operation 202, rather than traversing a pre-defined path or area, the robot 102 follows one or more hints. As referred to herein, a hint may be an instruction, a point, or an object that indicates to the robot 102 a direction in which to travel. For example, the robot 102 receive instructions via the GUI using the touchscreen, to begin exploring in a particular direction or at a particular point. The point may be a location detectable by the robot 102 using one or more sensors, or a location a particular distance from the robot. Additionally or alternatively, the robot 102 may detect, using one or more sensors, objects in the environment that are associated with particular directions. For example, a particular object may be used to indicate to the robot 102, when detected, that the robot 102 should turn at that location. Another object may indicate to the robot 102, when detected, that the robot 102 should not traverse or explore past that point. As another example, a particular object may transmit a signal, such as a Bluetooth low-energy signal, that indicates an instruction or direction of travel to the robot 102.

In an embodiment, the robot 102 receives input indicating that traversal of the environment is complete. For example, an operator may provide an instruction in the GUI using the touchscreen of the robot 102. Additionally or alternatively, the robot 102 determines that traversal is complete when it reaches the end of the route or area that it is traversing or exploring. Additionally or alternatively, the robot 102 determines that it has collected sufficient information to proceed with autonomous mapping and ends its traversal or exploration of the environment.

In an operation 204, the robot 102 assesses whether it has collected sufficient information to proceed with autonomous mapping. The assessment may include determining whether the robot has identified certain features during the demo route, such as programmed landmarks. Or, the assessment may include determining whether the demo route was greater than a stored threshold distance, for example 100 meters, whether the demo route involved collecting data about greater than a minimum number of features, turns, obstacles, and so forth.

In an operation 206, if the robot 102 has not collected sufficient information, then the robot 102 is programmed to generate and display a message via the GUI requesting the operator to initiate a longer demo route. In an embodiment, the operator may provide an instruction accepting to initiate a longer demo route and control of the process returns to operation 202. The longer demo route may include more areas, other floors, use of different elevators, and so forth.

Execution reaches operation 208 when the robot 102 has collected sufficient information in operation 204. In an embodiment, at operation 208, robot 102 may inform the operator that it has sufficient information by generating and displaying a message via the GUI. In an embodiment, robot 102 next begins autonomously mapping the environment starting from the endpoint of the demo route and traversing through the environment according to a programmed algorithm that is engineered to cause exhaustively traversing the environment. In an embodiment, as robot 102 traverses the environment, the robot is programmed to continuously compare the new sensor data acquired in traversal with existing data that was acquired during traversal of the demo route.

Further, robot 102 is programmed to continuously compare the new sensor data acquired in traversal with other data obtained from other robots that have operated in other environments and received via the port or other updates. In an embodiment, comparison of the data may be used in programmed algorithms for robot 102 to determine if a location area ahead is safe to navigate; for example, comparison of the data may indicate that the robot is about to encounter stairs, escalators or doorways opening into a street in parts of the environment that were not on the demo route and that the robot has not yet traversed.

In an embodiment, using the demo route and the other data noted above, robot 102 is programmed to determine whether a route or area ahead is part of a regular operating environment, as exemplified by the demo route and/or as defined in stored data. For instance, if the demo route traversed only corridors leading to hotel rooms, and analysis of a current location indicates that the location does not match the topography of the demo route, then the robot is programmed to display a prompt for human assistance.

In an embodiment, robot 102 uses the sensor data and a combination of heuristic calculations and machine learning algorithms to classify objects in the environment and identify boundaries between different areas for navigation. Example algorithms that may be programmed in robot 102 include, for example, scale-invariant feature transform (SIFT), speeded up robust features (SURF), oriented FAST and rotated BRIEF (ORB), and FMRIB's Linear Image Registration Tool (FLIRT). In some embodiments, identifying and classifying doorways is programmed to be performed automatically in real-time using techniques such as measuring the width of openings between walls on laser scans, identifying the color and shape of doorknobs, and performing Optical Character Recognition (OCR) on room number plates.

In an embodiment, as robot 102 identifies new areas for navigation, the robot creates and stores label values in association with locations in a stored map of the environment. Examples include "door," "hallway," "elevator," etc. In an embodiment, the label values may comprise human-readable text, and the robot may be programmed to transfer a copy of the stored map with label values to the facilities computer 108 or another remote host computer. In an embodiment, the facilities computer 108 is programmed to visually display the map in graphical form with the label values, and to receive operator input to edit one or more label values. In an embodiment, map data and label values may be transferred continuously during robot traversal, so that operator input can be received at the facilities computer 108 at the same time that the robot is traversing the environment. This approach permits editing or correcting the label values as robot traversal of the environment occurs, rather than in a post-processing step.

In an operation 210, robot 102 determines that it has encountered an unexpected area. The unexpected area is a potentially invalid area. Examples of unexpected areas include areas that are potentially unsafe or deviate from the normal operating environment. In an embodiment, robot 102 is programmed to report the locations of unexpected areas, at the same time that the areas are encountered, to a host computer such as facilities computer 108 or a mobile computing device over a wireless network. In an embodiment, robot 102 may be programmed to stop movement and await operator input to determine whether to continue operation or traversal. In an embodiment, sensor data and map visualizations may be provided to the operator in digital form for display at the facilities computer or mobile computing device, and the report from the robot 102 may include a prompt or request to decide whether the robot should explore the area.

In an embodiment, the unexpected area is an area or object whose data does not match the stored map data. For example, a new object may be placed in a previously mapped room, or a previously mapped object was moved. In an embodiment, the robot 102 is programmed to update the map data without waiting for operator input.

In operation 212, robot 102 receives an instruction in response to the request indicating that the robot should continue. In response to the instruction, robot 102 is programmed to add the unexpected area to a stored digital queue in memory that identifies areas not yet traversed or explored. In an embodiment, if the report of operation 210 does not result in a response of an operator or other input providing an instruction to continue movement, after the robot 102 has waited for a specified threshold time value, then the robot is programmed to digitally mark data representing the unexpected area as prohibited (invalid), and to resume traversal or exploration. Additionally or alternatively, robot 102 may continue traversal or exploration of other areas of the environment while waiting for an instruction in response to the request.

The foregoing process may continue, with recursive calls to different operations to resolve unexpected areas and continue traversal as needed, until the queue of unexplored areas has been emptied and the entire environment is explored.

In an embodiment, the robot 102 may be programmed to detect the location of one or more fiducials and to use location data at positions of the fiducials to define restricted areas in which robot operation is not permitted. For example, in an environment with poor lighting, the operator may place one or more printed fiducials on floors, doors or walls and then initiate traversal of the environment by the robot. In an embodiment, the robot 102 is programmed to recognize a specified fiducial pattern via image analysis of digital images captured via cameras or other visual sensors. In response to recognizing a fiducial, the robot 102 is programmed to identify and store a location value as a boundary value associated with a restricted area. In this manner the robot 102 may create and store data representing a virtual fence and the robot may be programmed not to operate past a virtual fence when regular traversal or exploration is occurring.

In an operation 214, the robot 104 determines that there are no valid areas remaining to explore. Valid areas to explore may be maintained in a queue in memory as previously noted. Areas that are not valid may include, for example, stairways, kitchens, bathrooms, service areas, guest rooms, and so forth.

4. Example Map Implementations

Figure 3:
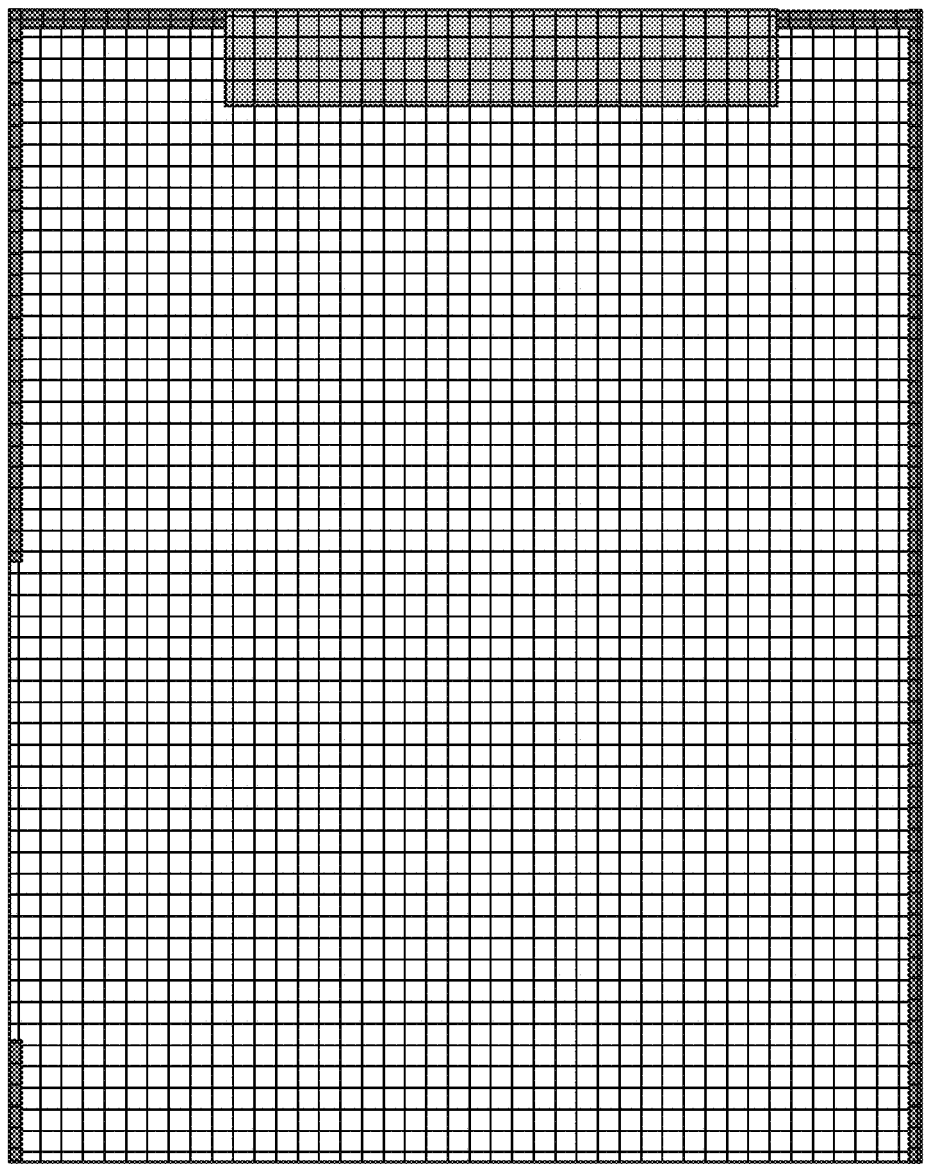
FIG. 3 is a portion of a pixel-level diagram of a robot-generated map, according to various embodiments.

FIG. 3 illustrates a portion of a robot-generated map, in one embodiment.

In the example of FIG. 3, a diagram 300 comprises a grid of individual pixel elements or pixels. In an embodiment, each pixel is associated with a cost value representing a cost to navigate the associated pixel; cost may be associated with ease of traversal in relation to obstructions, turns or objects. In an embodiment, white pixels indicate a zero cost to navigate, meaning that the location corresponds to open space and dark gray pixels indicate an infinite cost to navigate, indicating that the location corresponds to a wall or prohibited area. In an embodiment, medium gray pixels correspond to areas having an increased, but not infinite, cost to navigate; examples include a doorway or small area that may be difficult but not impossible to navigate.

Figure 4:
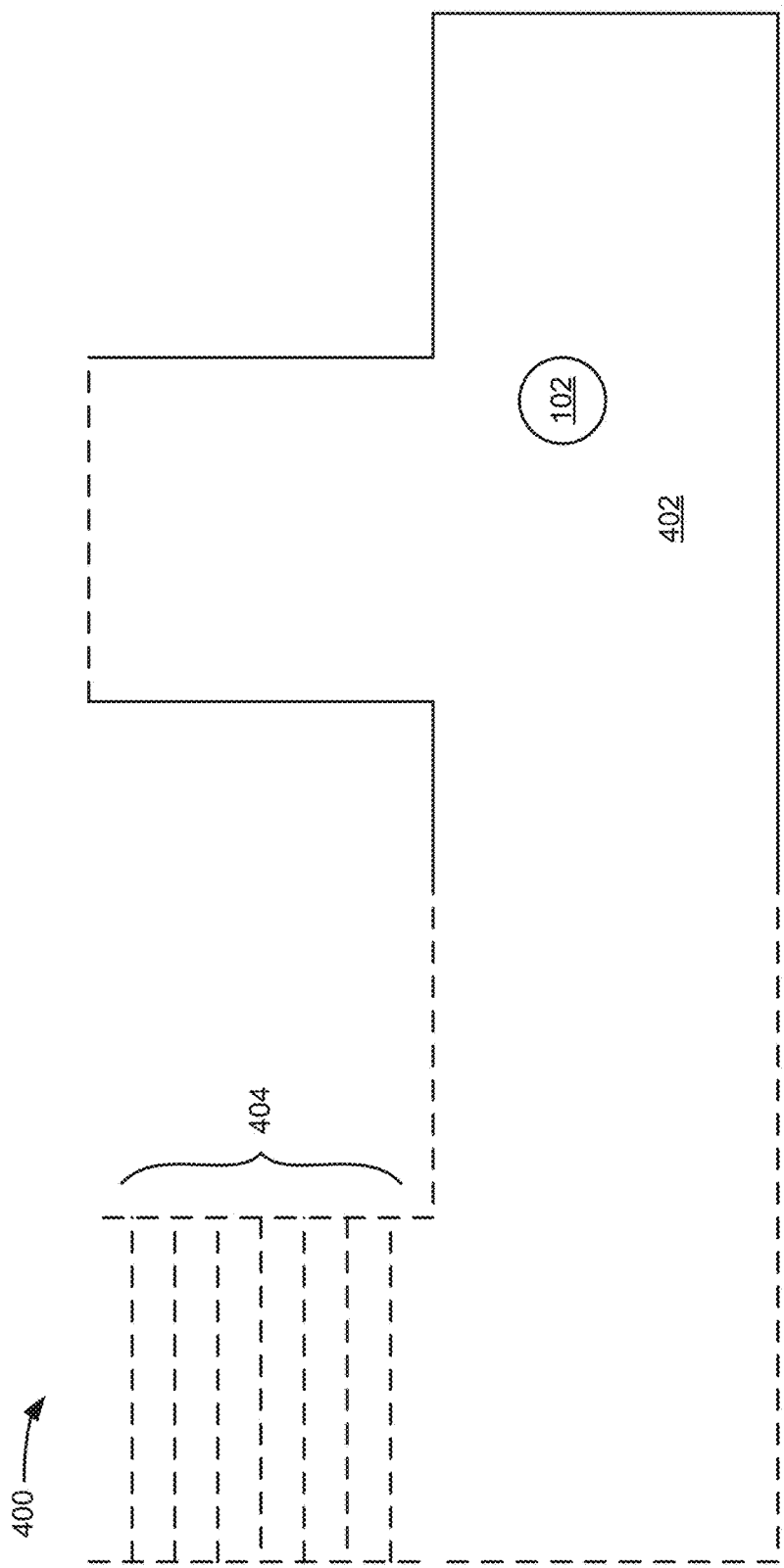
FIG. 4 is a portion of a diagram of a floor layout to be mapped by a robot, according to various embodiments.

FIG. 4 illustrates an example portion of a floor layout to be mapped by a robot.

In an embodiment, a floor layout 400 represents or depicts a hallway 402 and in which areas not yet mapped are shown using broken lines. The floor layout 400 includes a mapped portion in which the robot 102 is located. The hallway 402 has an area that is explored and two directions include areas not yet explored. In an embodiment, map pixels for unexplored areas are initially associated with a zero cost value, which may be updated to a value greater than zero as traversal or exploration occurs. For example, a stairway 404, once identified or mapped, may be assigned an infinite cost value.

Figure 5A:
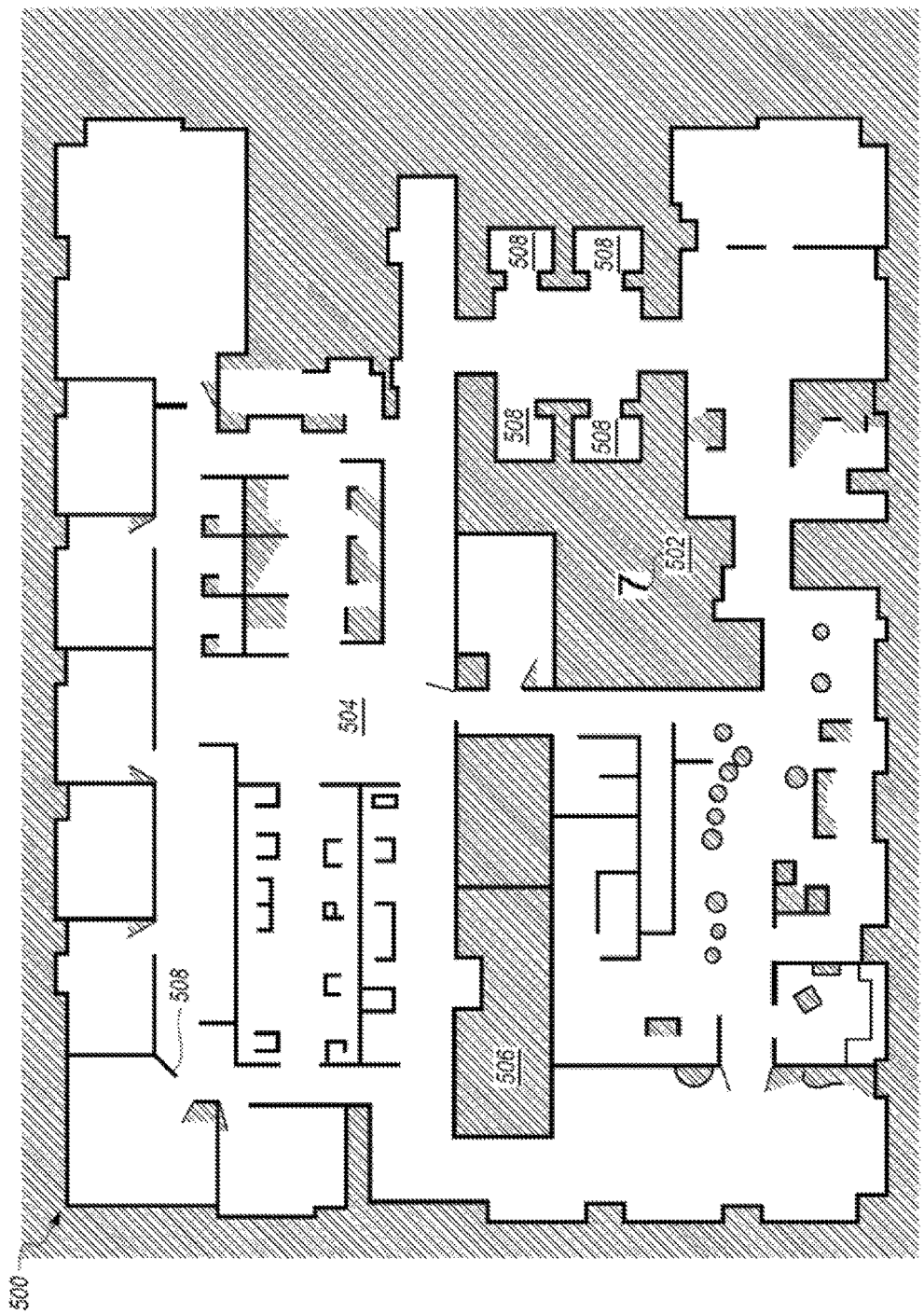
FIG. 5A and FIG. 5B are examples of robot-generated maps of a floor in a building, according to various embodiments.

FIG. 5A illustrates an example of a robot-generated map. For purposes of illustrating a clear example and not as a limitation, FIG. 5A illustrates a map of a floor of a building.

In an embodiment, map 500 includes an annotation 502 of the floor for which the map was generated. White area 504 is associated with pixels having low cost values and corresponds to spaces that a navigable by the robot including hallway and larger rooms. Gray areas 506 include areas that the robot can navigate, with a higher cost of navigation, and are associated with higher cost values. These areas may include, for example, bathrooms, small rooms or corners, or cluttered areas. Black lines 508 have high or infinite cost values and correspond to interior or exterior walls. Elevators 508 may be used by the robot 102 to navigate between floors.

Additionally or alternatively, a robot-generated map may comprise graph data that defines a plurality of nodes and edges. Each node may represent a location navigable by the robot, such as a hallway or a room. Each edge may represent an ability to move from one location to a connected location. Additionally, each edge may be associated with a cost to move from a location to the connected location.

Figure 5B:
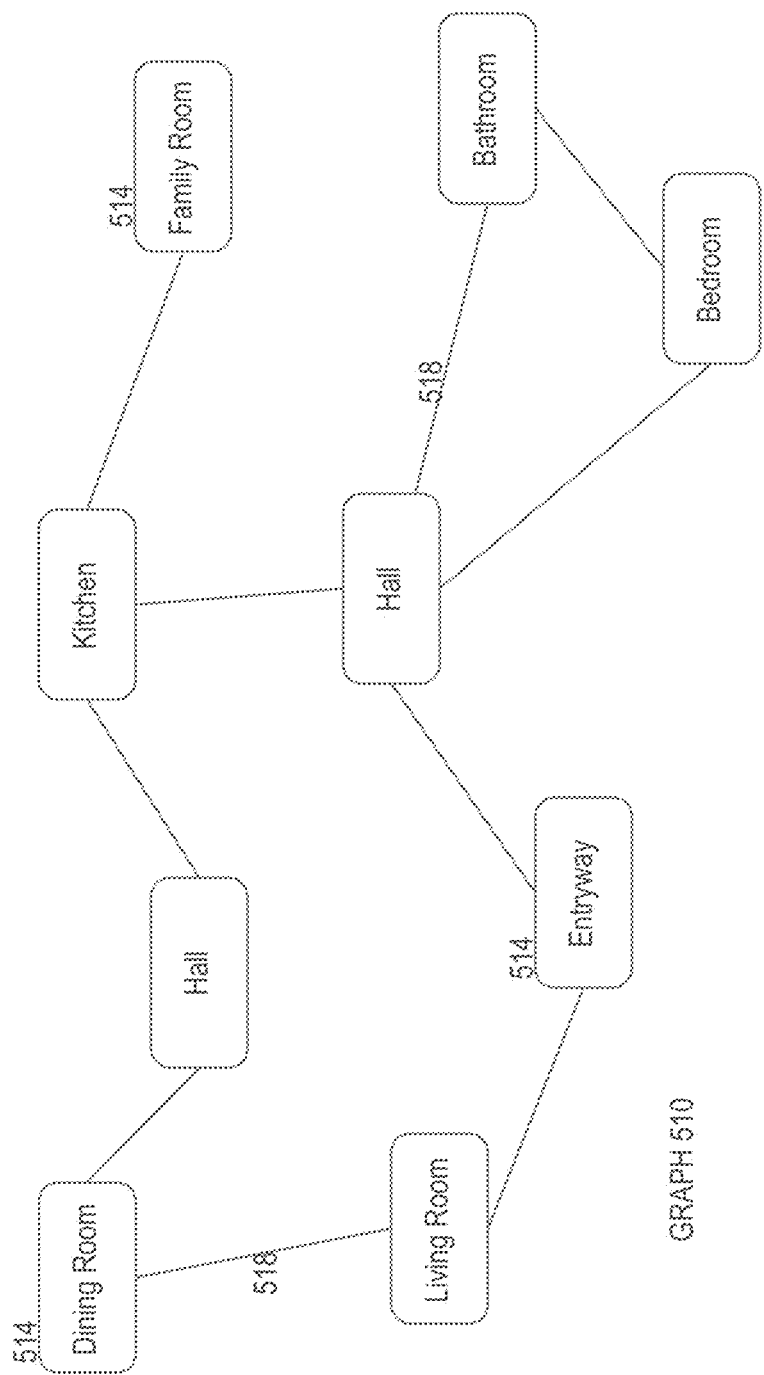

FIG. 5B illustrates an example graph that may be part of a robot-generated map. In an embodiment, graph 510 includes a plurality of nodes 514 and a plurality of edges 518. Each node 514 is connected to one or more other nodes 518 by an edge 518. Each edge 518 may be associated with a cost. Additionally or alternatively, if the cost of navigation is too high, for example if the rooms are connected by a set of stairs, then the robot-generated map may not include the edge in the graph.

Additionally or alternatively, a robot-generated map may comprise other types of data that describe the environment. For example, the robot-generated map may comprise data associating a plurality of map features with respective location information. Other example maps may include object semantic maps and free space maps. The techniques described herein are not limited to any particular type of robot-generated map.

5. Example Graphical User Interface

Figure 6:
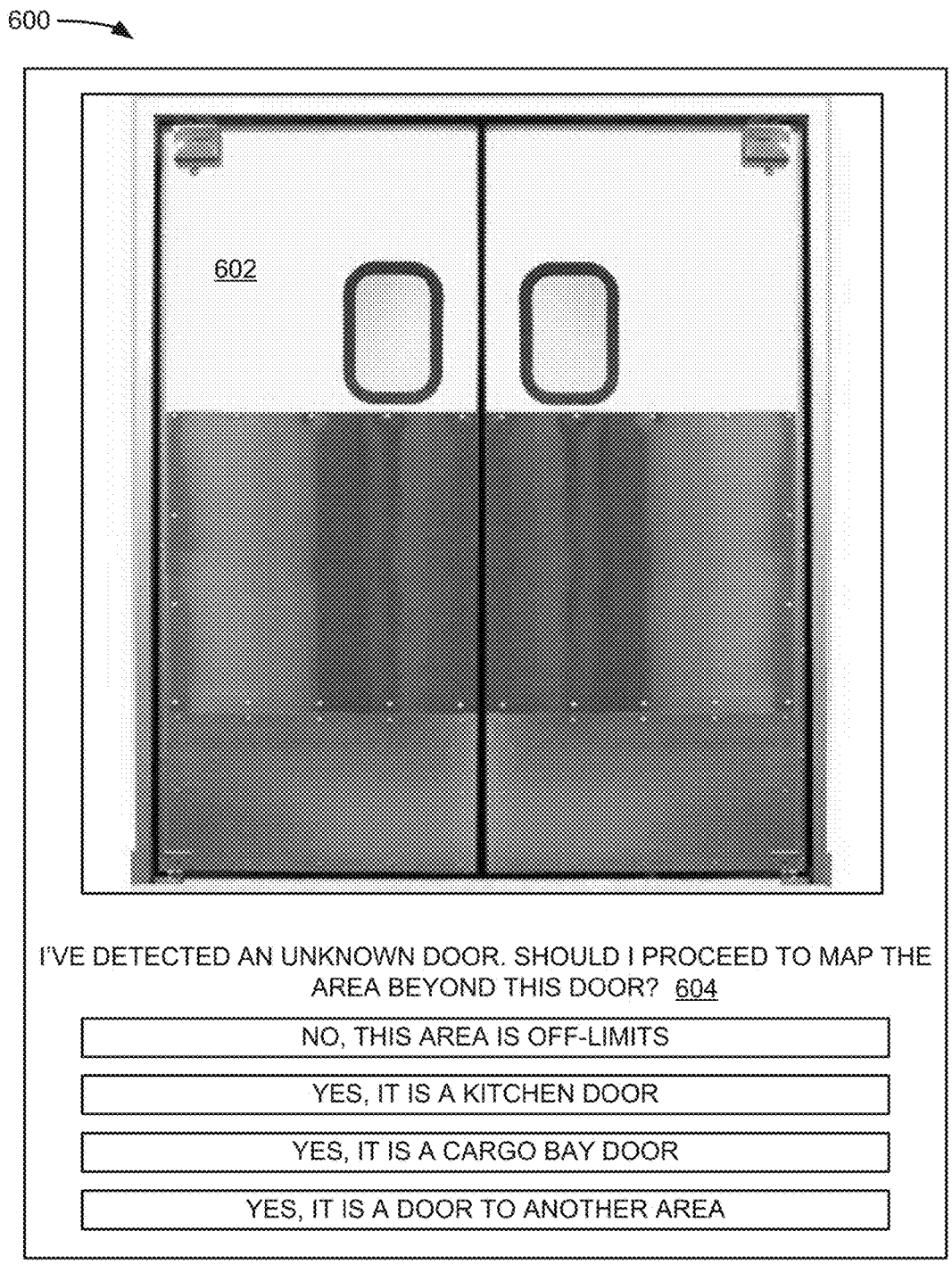
FIG. 6 is an example user interface for receiving input from an operator, according to various embodiments.

FIG. 6 illustrates a portion of an example graphical user interface that may be displayed using a computer for purposes of receiving input from an operator, in one embodiment.

In an embodiment, robot 102 may be programmed to generate and display user interface 600 using a touchscreen of the robot. In other embodiments, user interface 600 may be presented to the user within an application program that is executed by facilities computer 108, or in a web application that is generated by a networked server computer and accessed using a browser at a computer such as the facilities computer 108. In some embodiments, the user interface 600 may be delivered using one or more hypertext markup language (HTML) email messages.

In an embodiment, robot 102 generates the user interface 600 to request information during autonomous mapping, for example in operation 210 of FIG. 2. In an embodiment, user interface 600 comprises a digital image 602 showing a visual image captured directly using a sensor of robot 102, or a digital image that the robot generates or forms indirectly under program control based on data input from one or more of the sensors. In various embodiments, image 602 may comprise a laser image, a LIDAR image, a photograph, or an image captured by a 3D camera. The image 602 may show a feature that has been categorized by the robot 102 as a door, window, or other feature, and a feature characterization label value may be displayed in association with the image. In some instances, the user interface 600 comprises more than one window to display multiple images.

In an embodiment, user interface 600 comprises a prompt 604 that may include, for example, a question to be answered by the operator. In the example of FIG. 6, prompt 604 comprises the question "I've detected an unknown door. Should I proceed to map the area beyond this door?" Content for the prompt 604 may be digitally stored in memory or defined as part of the control program of the robot and retrieved in response to specified conditions as determined by algorithms programmed in the control program. In an embodiment, prompt 604 includes four options including: "No, this area is off-limits."; "Yes, it is a kitchen door."; "Yes, it is a cargo bay door."; and "yes, it is a door to another area." In an embodiment, each of the options is displayed in user interface 600 and the robot 102 is programmed to detect input via the touchscreen or other input device to provide a signal in response to the prompt. Other user interfaces may include different prompts with different options or different input mechanisms such as text entry.

Figure 7:
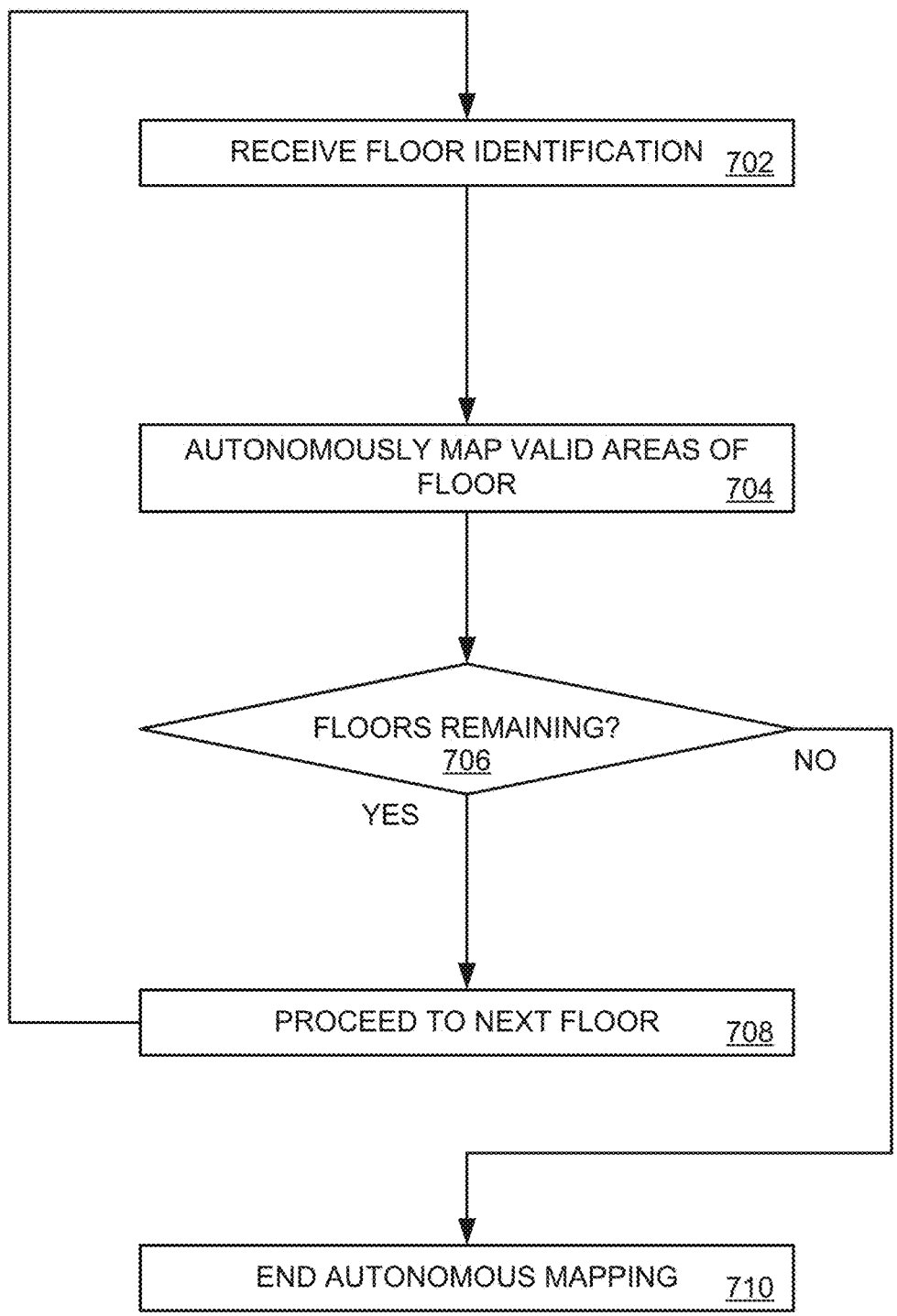
FIG. 7 is a flowchart of an example process for autonomously mapping more than one floor of a building, according to various embodiments.

FIG. 7 is a flowchart of an example process for autonomously mapping more than one floor of a building in an embodiment.

In an embodiment, robot 102 performs process 700 under program control in buildings having a plurality of separated areas, such as multiple floors, particularly if the floors are similar. For example, a hotel may have multiple floors of guest rooms that are similar in arrangement. Hotel floors may have similar hallways with elevators, housekeeping areas, and guest rooms laid out in the same way from floor to floor. In some embodiments, the process 700 may be used to navigate automated doors that connect rooms.

In some embodiments, robot 102 may be programmed to detect an elevator without fiducials; in one approach, facilities access computer 106 provides robot 102 with a network address of the elevator. Furthermore, the demo route described above for operation 202 (FIG. 2) may include at least one movement using the elevator. For example, in a hotel, the demo route may include a path from the lobby to the elevator, from the elevator to floor "5", then from the elevator to a numbered guest room. When the robot 102 is in the proximity of the elevator and riding the elevator during the demo route, the robot is programmed to use data from variations in barometer readings, inertial measurements, laser scans and image recognition to identify the elevator and locate the elevator on the map of the current floor. In an embodiment, fiducials are used and the demo route does not need to include a ride in the elevator since the robot 102 is programmed to discover elevators automatically during exploration of the floor by identifying one of the fiducials at the elevator using a machine vision algorithm. Additionally, the techniques may be used to discover and identify other transportation mechanisms that connects separated areas of the environment, such as shuttles, moving platforms and walkways, and escalators.

In an operation 702, robot 102 is programmed to determine a floor identification value that identifies the floor on which the robot is current located. The floor identification value may be a number, character or alphanumeric combination. Robot 102 may be programmed to determine the floor identification value based on, for example, optical character recognition of signs on walls. For example, a floor may include a sign specifying the floor number in an elevator lobby. In many multi-story buildings, offices or rooms are numbered using a convention in which the first digit corresponds to the floor number. In some embodiments, facilities access computer 106 or an elevator computer may communicate a floor number to robot 102 via the WIFI network when the robot 102 is in or near an elevator of a multi-story building. In some instances, robot 102 may detect a fiducial on a wall, floor or door and read a floor number from indicia of the fiducial; the indicia may be human-readable or encoded using bar codes, or Quick Response (QR) codes. In the case of multi-elevator buildings or single-elevator buildings where the detection of the elevator by the robot's sensors is challenging, fiducials with QR codes may be placed in elevator cars and the robot 102 may be programmed to search for a fiducial upon entering an elevator and to identify an elevator car number and/or network address of an elevator computer. Encryption methods can be used in the QR code to prevent systems other than the robot 102 from decrypting and using data encoded in the fiducial.

In operation 704, robot 102 autonomously maps valid areas of a space, region or floor as described above in connection with process 200 and FIG. 2. In an embodiment, if the robot 102 moves using an elevator car to a floor that the robot has not yet mapped or traversed, then the robot is programmed to start a new map and label the new map with the received floor number. In an embodiment, if the elevator car arrives at a floor where a map was already started, then the robot 102 is programmed to reload the previous map from storage and to resume mapping using the previous map. In various embodiments, robot 102 is programmed to operate responsive to selection of special mapping modes. For example, in a "Guest floor" mapping mode, mapping open guest rooms of a hotel is not needed or desired; it is sufficient to map common areas and doors.

In an operation 706, robot 102 is programmed, in response to completing mapping valid areas of a space or floor, to determine whether other floors are represented in stored data but are not yet mapped. For example, in one embodiment, map data or configuration data that is initially loaded in robot 102 specifies a plurality of valid floor numbers. Optionally, the map data or configuration data may specify one or more floors that are not to be traversed or mapped. Preferably, floor data stored as part of map data or configuration data uses the same floor numbers as an elevator system or system of fiducials. In such an arrangement the robot 102 may be programmed to compare a detected floor number to the stored map data or configuration data and will accurately determine whether to exit the elevator at a given floor.

In an operation 708, in an embodiment, robot 102 is programmed to return to an elevator in response to detecting that unmapped floors are represented in stored data. In an embodiment, robot 102 is programmed to call the elevator computer to invoke an elevator recall function, enter an elevator car, and instruct the elevator to move an unmapped floor.

In an embodiment, process 700 returns to operation 702.

In operation 710, robot 102 is programmed to end autonomous mapping in response to detecting that no unmapped floors are represented in stored map data or configuration data. Further, in response to ending autonomous mapping, robot 102 may be programmed to return to the robot port.

6. Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
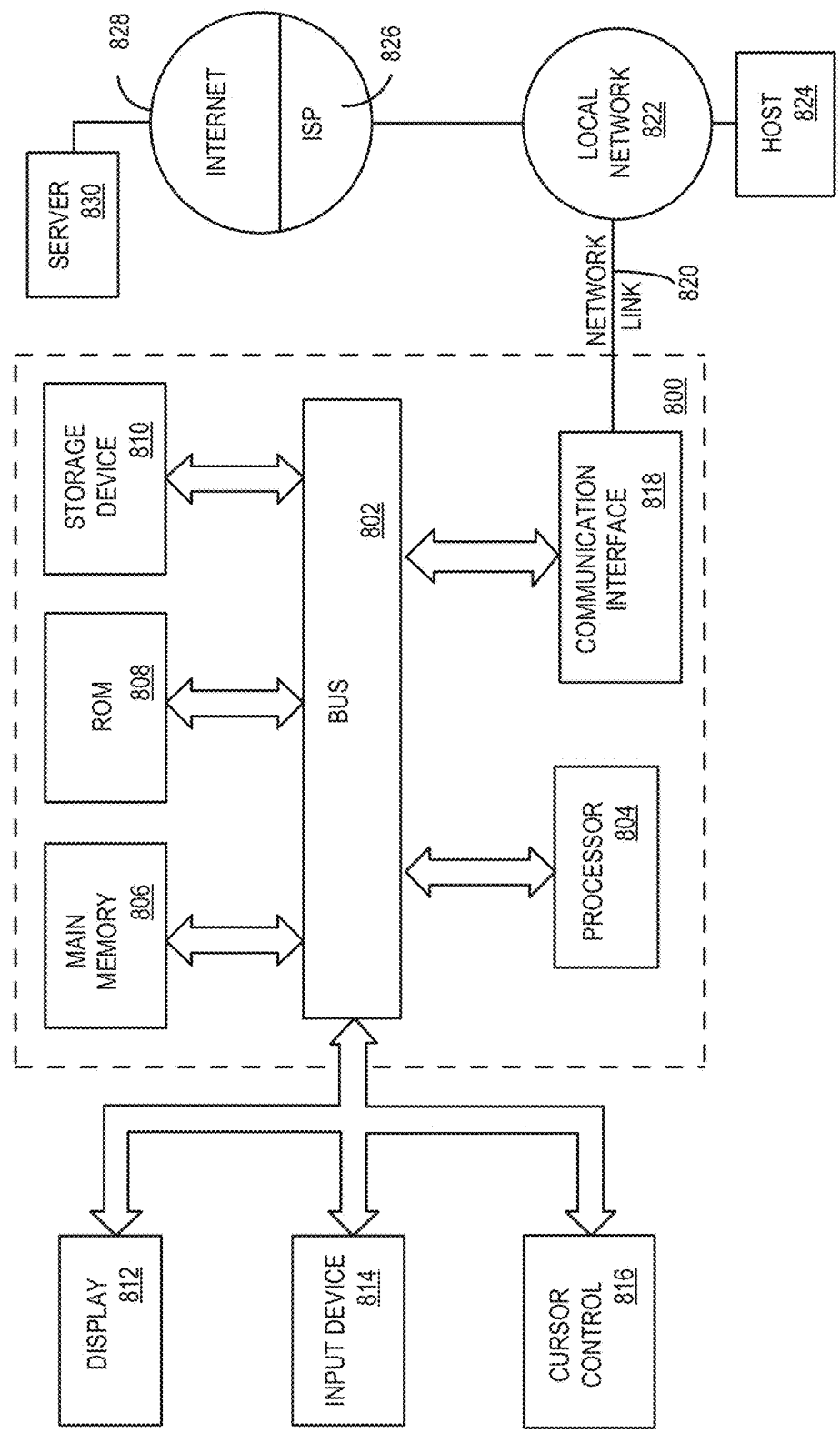
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Display 812 may also be touch-enabled for communicating gestures, touch interactions, and other user interactions to processor 804.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for a robot to autonomously generate a digitally stored map of an environment, the method comprising:
    receiving, via an input signal to a stored program executing in the robot, an instruction to physically traverse a route within the environment, the route comprising a path through the environment, and in response to the input signal, initiating physical traversal of the robot of the route;
    while traversing the route, collecting digital data from one or more sensors of the robot and digitally transforming the collected digital data to result in identifying one or more features of the environment and to generate a digitally stored initial map representing the environment that has been traversed;
    in response to detecting completion of traversal of the route, initiating traversal of the environment using other than the route, and:
    concurrently generating and digitally storing a digital map of valid areas of the environment;
    while generating the digital map, determining that a particular area is potentially invalid based on detecting features of the environment that are not represented in stored environment data, and in response, generating and transmitting an electronic message comprising collected sensor data for the particular area and a prompt requesting information indicating whether the particular area is valid;
    in response to input indicating that the particular area is valid, traversing the particular area and continuing generating the digital map, and in response to input indicating that the particular area is invalid, avoiding traversing the particular area and moving to an unmapped valid area of the environment;
    repeating the preceding steps relating to generating the digital map until all valid areas of the environment have been traversed.

2. The method of claim 1, further comprising, in response to detecting completion of traversal of the route, determining that the sensor data collecting during the route is insufficient to begin autonomously generating the map and requesting a second route comprising a second path through the environment.

3. The method of claim 1, wherein the route comprises traveling between separated areas of the environment using a transportation mechanism and at least one separated area of the environment is an invalid area.

4. The method of claim 1, further comprising identifying an elevator of a plurality of elevators using sensor data, and executing a machine vision algorithm using a computer in the robot to determine that the elevator is associated with a particular elevator number.

5. The method of claim 1, wherein autonomously generating the map comprises moving between two or more separated areas of the environment.

6. The method of claim 1, wherein autonomously generating the map comprises the robot programmatically communicating with a facilities access computer to utilize a transportation mechanism or to open an automatic door.

7. The method of claim 1, wherein autonomously generating the map comprises automatically labelling rooms and corridors in the digital map.

8. The method of claim 1, wherein the route is a demonstration route comprising a pre-defined path through the environment.

9. The method of claim 1, wherein the route comprises one or more hints indicating at least one or more of: a starting location, a direction of travel, a distance of travel, an area to avoid, an area to traverse, an environment feature to follow, and a turn direction.

10. The method of claim 1 wherein the digital map comprises a plurality of pixels that are associated with the valid areas, wherein each pixel of the digital map is associated with a cost value representing a relative cost of the robot navigating one of the valid areas that is associated with the pixel.

11. The method of claim 10 wherein a first pixel corresponding to an impassable location in the environment has a higher cost value than a second pixel corresponding to a passable location in the environment.

12. The method of claim 1 wherein the digital map comprises graph data indicating a plurality of nodes and a plurality of edges, wherein each node of the plurality of nodes represents a valid area, and each edge of the plurality of edges represents an ability to navigate between two valid areas.

13. A robot programmed to execute a method to autonomously generate a digitally stored map of an environment, the robot comprising:
    one or more computers;
    one or more digital sensors that are coupled to the one or more computers and operable under program control of the one or more computers to collect signals based upon sensing the environment of the robot;
    a non-transitory computer-readable storage medium coupled to the one or more computers and storing instructions which when executed by the one or more computers cause performing:
    receiving, via an input signal to a stored program executing in the robot, an instruction to physically traverse a route within the environment, the route comprising a path through the environment, and in response to the input signal, initiating physical traversal of the robot of the route;
    while traversing the route, collecting digital data from one or more sensors of the robot and digitally transforming the collected digital data to result in identifying one or more features of the environment and to generate a digitally stored initial map representing the environment that has been traversed;

in response to detecting completion of traversal of the route, initiating traversal of the environment using other than the route, and:

concurrently generating and digitally storing a digital map of valid areas of the environment;

while generating the digital map, determining that a particular area is potentially invalid based on detecting features of the environment that are not represented in stored environment data of the robot, and in response, generating and transmitting an electronic message comprising collected sensor data for the particular area and a prompt requesting information indicating whether the particular area is valid;

in response to input indicating that the particular area is valid, traversing the particular area and continuing generating the digital map, and in response to input indicating that the particular area is invalid, avoiding traversing the particular area and moving to an unmapped valid area of the environment;

repeating the preceding steps relating to generating the digital map until all valid areas of the environment have been traversed.

14. The robot of claim 13, further comprising instructions which when executed by the one or more computers cause, in response to detecting completion of traversal of the route, determining that the sensor data collecting during the route is insufficient to begin autonomously generating the map and requesting a second route comprising a second path through the environment.

15. The robot of claim 13, wherein the route comprises traveling between separated areas of the environment using a transportation mechanism and at least one separated area of the environment is an invalid area.

16. The robot of claim 13, further comprising instructions which when executed by the one or more computers cause identifying an elevator of a plurality of elevators using sensor data, and executing a machine vision algorithm using a computer in the robot to determine that the elevator is associated with a particular elevator number.

17. The robot of claim 13, wherein autonomously generating the map comprises moving between two or more separated areas of the environment.

18. The robot of claim 13, wherein autonomously generating the map comprises the robot programmatically communicating with a facilities access computer to utilize a transportation mechanism or to open an automatic door.

19. The robot of claim 13, wherein autonomously generating the map comprises automatically labelling rooms and corridors in the digital map.

20. The robot of claim 13, wherein the route is a demonstration route comprising a pre-defined path through the environment.

21. The robot of claim 13, wherein the route comprises one or more hints indicating at least one or more of: a starting location, a direction of travel, a distance of travel, an area to avoid, an area to traverse, an environment feature to follow, and a turn direction.

22. The robot of claim 13 wherein the digital map comprises a plurality of pixels that are associated with the valid areas, wherein each pixel of the digital map is associated with a cost value representing a relative cost of the robot navigating one of the valid areas that is associated with the pixel.

23. The robot of claim 22 wherein a first pixel corresponding to an impassable location in the environment has a higher cost value than a second pixel corresponding to a passable location in the environment.

24. The robot of claim 13 wherein the digital map comprises graph data indicating a plurality of nodes and a plurality of edges, wherein each node of the plurality of nodes represents a valid area, and each edge of the plurality of edges represents an ability to navigate between two valid areas.

* * * * *